July 9, 1963   R. R. KEGG ET AL   3,096,684
FENESTRATION STRUCTURE FOR CONTROL OF DAYLIGHTING
Filed Nov. 12, 1958   4 Sheets-Sheet 1

INVENTORS
R. R. KEGG
R. E. LABRECQUE
BY R. C. WARNKE
W.A. SCHAICH &
E. J. HOLLER
ATTORNEYS

July 9, 1963 R. R. KEGG ET AL 3,096,684
FENESTRATION STRUCTURE FOR CONTROL OF DAYLIGHTING
Filed Nov. 12, 1958 4 Sheets-Sheet 3

INVENTORS
R. R. KEGG
R. E. LABRECQUE
BY R. C. WARNKE
W. A. SCHAICH &
E. J. HOLLER
ATTORNEYS

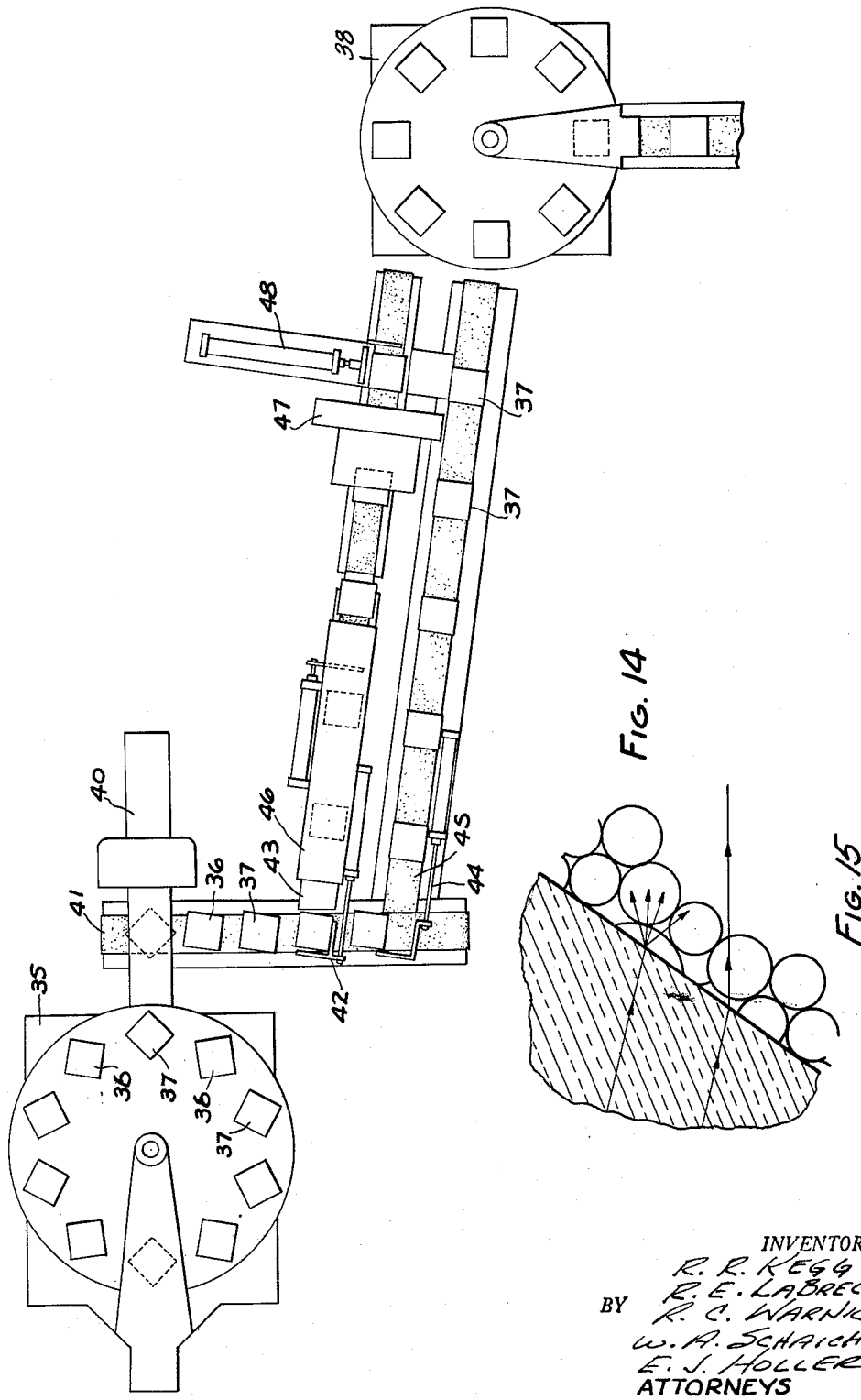

United States Patent Office 3,096,684
Patented July 9, 1963

3,096,684
FENESTRATION STRUCTURE FOR CONTROL OF DAYLIGHTING
Robert R. Kegg, Toledo, Raymond E. La Brecque, Zanesville, and Richard C. Warnke, Toledo, Ohio, assignors, by mesne assignments, to Owens-Illinois Glass Company, Toledo, Ohio, a corporation of Ohio
Filed Nov. 12, 1958, Ser. No. 773,342
6 Claims. (Cl. 88—60)

This invention relates to the utilization of daylight for lighting the interior of a building and particularly to the construction of fenestration utilizing spaced sheets of light-transmitting material such as are found in a glass block.

It has been more recently taught in the art that by utilizing ribs and prisms of particular configuration on the surfaces of sheets of light-transmitting material efficient control of daylight may be achieved thereby producing more effective illumination of the interior of a room. Such structures are taught in the recent patents to Robert A. Boyd, Nos. 2,768,556, titled "Control of Daylighting," issued October 30, 1956; 2,812,690, titled "Skylights," issued November 12, 1957; and 2,812,691, titled "Skylights," issued November 12, 1957.

Although the constructions disclosed and claimed in these patents produce very effective results, it has been found desirable in some applications to reduce the brightness of the light to a desired and required value by providing a glass mat between the light-transmitting walls of the glass block. The provision of such a mat necessitates additional labor and results in increased cost in the fenestration structure. In addition, in order to provide more pleasing effects, efforts have been made to color the glass mat, but these have not proved entirely successful.

It is an object of this invention to provide a fenestration structure comprising spaced sheets of light-transmitting material which have the desired light-transmitting characteristics and in which brightness is lowered to a desired level.

It is a further object of the invention to provide a method and apparatus for producing such fenestration.

It is a further object of the invention to provide a fenestration structure which has a pleasing effect to the eye of an observer when viewed from the interior and the exterior of a room.

It is a further object of the invention to provide a fenestration structure which has a relatively low dew point temperature.

In the drawings:

FIG. 14 is a diagrammatic plan view of an apparatus for forming glass block embodying the invention.

FIG. 15 is a partly diagrammatic view on a greatly enlarged scale similar to FIG. 5.

Figure 1:
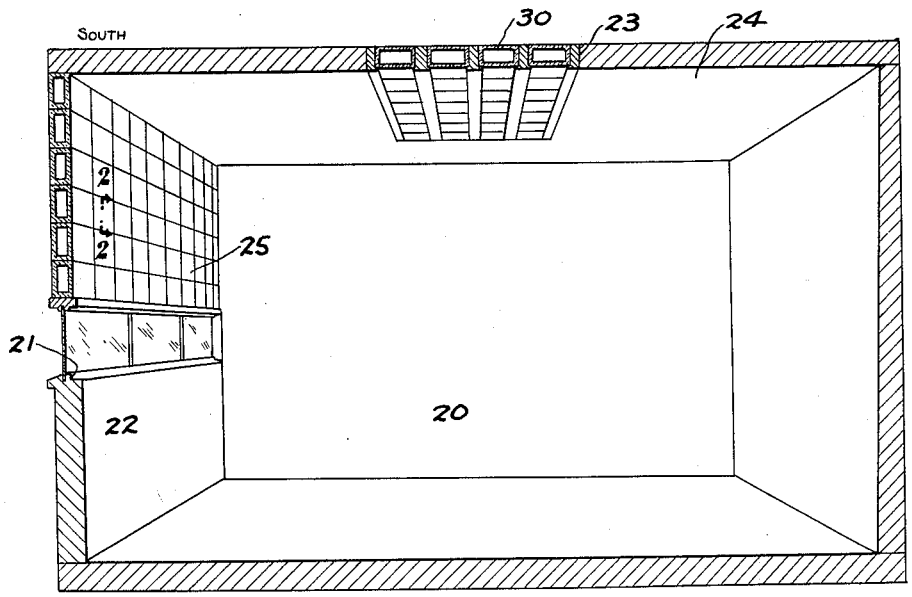
FIG. 1 is a sectional perspective view of a room embodying the fenestration structure which incorporates the invention.

Utilization of daylight to the interior of a typical room may be illustrated by referring to FIG. 1. As shown in FIG. 1 daylight may be permitted to enter the interior of room 20 either through an opening 21 in wall 22 or through an opening 23 in ceiling 24.

In order to provide a high quality of lighting at various task locations within the interior of room 20, it is essential that the level of illumination must be sufficiently high and not vary appreciably from one task location in the room to another. In addition, the level of illumination should be as uniform as possible even though the exterior illumination may change due to changing sun positions. Finally, the ratio of brightness of the fenestration to brightness of the task must be kept low. In this regard, it is also important that the brightness of the fenestration when viewed directly by the observer should be at sufficiently low level that it will be pleasing to view.

Figure 2:
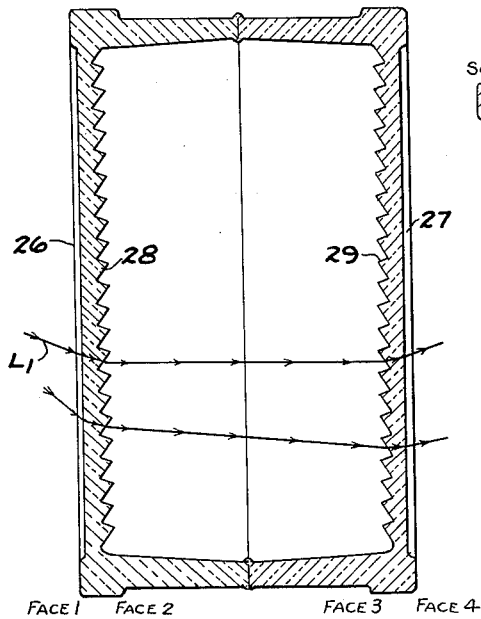
FIG. 2 is a sectional elevational view on an enlarged scale taken along the line 2—2 in FIG. 1.

As shown in the aforementioned patent to Boyd 2,768,-556, the control of daylight through vertical wall 22 may be achieved by providing four air-glass interfaces such as are found in a block 25 or spaced sheets of glass to form the fenestration in wall 22. A typical vertical cross section of such a block 25 is shown in FIG. 2 and comprises four air-glass interfaces. In such a block the interfaces are conventionally termed faces 1, 2, 3 and 4, face 1 being the exterior interface, faces 2 and 3 being the inside interfaces, and face 4 being the interface nearest the interior of the room. As disclosed in Boyd Patent 2,768,556, faces 1 and 4 are provided with vertical ribs 26, 27 having particular configurations and faces 2 and 3 are provided with horizontal prisms 28, 29. The configuration of ribs 26 on face 1 is such that light from wide azimuth angles is refracted and internally reflected, and then transmitted to face 2 at zero or small azimuth angles. This construction of the ribs on face 1 provides a greater transmission of light and a more uniform illumination of faces 2 and 3. In addition, this construction which is capable of utilizing light from wide azimuth angles aids in maintaining desired lighting conditions with exterior illumination changes throughout the day or seasons of the year.

Horizontal prisms 28 on face 2 receive light from above the horizontal and direct the light in a generally horizontal direction. By the combined effect of ribs 26 on face 1 and prisms 28 on face 2, the greater percentage of light approaches prisms 29 on face 3 in a direction substantially perpendicular to face 3. Prisms 29 on face 3 receive the light and direct the light upwardly above the horizontal in directions toward the ceiling of the room. The configuration of vertical ribs 27 on face 4 is such that the light which approaches in directions at zero or small azimuth angles is diffused in azimuth directions in order to maintain more uniform conditions in the room and to lower the brightness of the faces.

Figure 3:
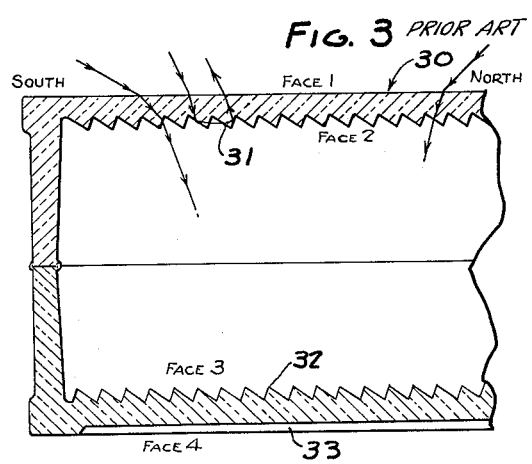
FIG. 3 is a fragmentary sectional view on an enlarged scale taken along the line 3—3 in FIG. 1.
Figure 4:
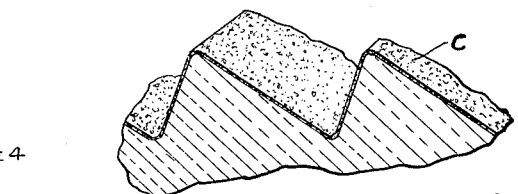
FIG. 4 is a fragmentary perspective view on an enlarged scale of a portion of the fenestration structure shown in FIG. 2.

As shown in the aforementioned Boyd Patents 2,812,-690 and 2,812,691, the control of daylight through an opening in the ceiling may be achieved by using four air-glass interfaces such as are present in a hollow glass block or in two spaced sheets of glass. A plurality of such blocks 30 is positioned in opening 23 in ceiling 24 with the sheets or walls thereof in substantially horizontal position. A vertical cross section of one of said blocks is shown in FIG. 3. Face 1 is provided with a smooth surface or a series of longitudinal ribs extending in a generally north-south direction. Face 2 is provided with a series of parallel prisms 31 extending in a generally east-west direction. Faces 3 and 4 are provided with ribs 32, 33 in order to diffuse the transmitted light into the interior being lighted. Prisms 31 on face 2 are so constructed and arranged that direct sunlight at high altitudes from a southerly direction is rejected, whereas light from low altitudes and the northern sky is transmitted.

In instances where direct sunlight does not strike the glass blocks it is possible to use blocks wherein the faces are formed with smooth surfaces.

According to the invention a vitreous-type coating comprised of glass forming constituents is provided on face 2 or 3 of the glass block in the form of a cellular agglomeration which is in partial optical contact with the surface. The coating is preferably applied by spraying a solution of a silicate, sand and water, with or without pigment, on the glass surface after it has been formed from a gob of glass and prior to its having been cooled down below a temperature at which the surfaces of the glass would check or crizzle due to the spraying of a liquid thereon. The resultant coating acts to substantially reduce the brightness without adversely affecting the action of the prisms which are on the surface bearing the coating.

Figure 13:
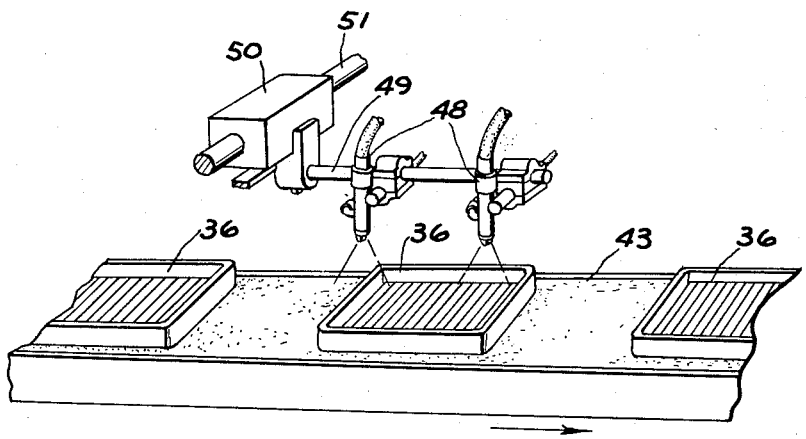
FIG. 13 is a perspective view of a portion of an apparatus for forming the fenestration.

The method and apparatus for applying the coating may be more clearly understood by referring to FIGS. 13 and 14. FIG. 14 is a diagrammatic plan view of a glass block-forming mechanism including a press 35 to which hot gobs of glass are periodically fed to form the halves 36, 37 of a glass block and a sealing machine 38 wherein the glass block halves are sealed to form the glass block. Each glass block half includes a face wall and peripheral end walls or flanges.

Alternate molds of press 35 are of proper configuration to form the two halves. A transfer mechanism 40 removes the glass block halves from press 35 and places them on a conveyor 41. As the glass block halves are moved along the conveyor, alternate glass block halves 36 are removed by a transfer ram 42 and placed on a conveyor 43. The remaining glass block halves 37 are removed by a ram 44 and transferred onto a conveyor 45. The glass block halves are positioned on the conveyors with the end walls thereof extending upwardly so that the inner or cavity faces, that is, face 2 or face 3, as the case may be, are exposed.

As glass block halves 36 are moved along on conveyor 43, they are passed below a heater 46 which maintains the glass block halves at elevated temperature and prevents them from becoming unduly cooled. Glass block halves 36 are then passed below a spray mechanism 47 which applies the coating material, after which they are transferred by a transfer mechanism 48 onto conveyor 45 at positions between glass block halves 37, thus reestablishing the relationship that the alternate glass block halves are identical. The glass block halves are then transferred by hand or suitable mechanism from the end of conveyor 45 to sealing machine 38 wherein the complementary peripheral end walls or flanges of each pair 36, 37 are sealed. In this manner the space between the faces and end walls of the glass block halves is hermetically sealed. In some instances a separate operation is performed to draw a vacuum and thereby provide a vacuum in the space between the glass block halves. A partial vacuum may be produced in the glass block when the gases sealed therein are cooled. Alternatively, a vent hole may be provided in one block half. A vacuum is drawn through the vent hole after the complementary peripheral end walls of the glass block halves are sealed together and the vent hole is sealed.

In instances such as blocks shown in FIGS. 2 and 3, which have prisms on the inner faces thereof, the glass block halves are carried along conveyor 43 below spray mechanism 47 with the prisms extending transversely of the path of movement of the conveyor (FIG. 13).

In addition, in order to adequately cover the surfaces of the prisms, the spray mechanism which comprises a plurality of guns 48 is reciprocated transversely of the conveyor as the glass block halves are moved below the guns on the conveyor. As shown in FIG. 13, guns 48 are mounted on a shaft 49 which, in turn, is supported on a carriage 50 reciprocated on a cross shaft 51.

We have found that a satisfactory coating solution comprises a mixture of an aqueous solution of a silicate and sand. In addition, inert coloring pigments may be added to provide a color for the coating.

It is essential that the surface of the glass which is to be coated is at a sufficiently high temperature in order that proper evaporation may take place to produce the desired cellular agglomeration and to prevent checking or crizzling of the surfaces of the glass due to the spraying of the relatively cool liquid thereon.

Although we do not wish to be bound by the theory involved, in our opinion, the cellular agglomeration condition with partial optical contact is achieved by the evaporation of the water in the coating mixture as the spray contacts the surface which is at an elevated temperature.

Although the temperature of the surface which is being coated may vary, we have found that satisfactory results may be achieved where the center of the surface which is being sprayed is at a temperature of approximately 1000° F.

The following examples are representative of the satisfactory results which have been achieved:

EXAMPLE I

Glass block halves of soda lime glass were sprayed after being formed and before cooling below 900° F. with a solution of the following composition:

| | |
|---|---|
| 180 parts | sodium silicate |
| 62 parts | water |
| 180 parts | sand |

The sodium silicate had an average composition of 6.75% $Na_2O$ and 25.3% $SiO_2$ at a viscosity of 220 centipoises plus or minus 10 centipoises at 68° F. and a specific gravity of 35.0 degrees Baumé plus or minus 1.0 degree Baumé at 68° F. The sand was 200 mesh silica sand by U.S. standard passing 98% at 200 mesh and 80% at 325 mesh.

The resultant coating had the appearance of a white sponge-like cellular agglomeration.

The glass block halves were then sealed together and the resultant glass block had the desired light-transmitting characteristics as more fully described below.

EXAMPLE II

A glass block was coated with the same composition as set forth above except that the silicate comprised 80% sodium silicate having the same composition as in Example I and 20% potassium silicate. The potassium silicate has an average composition of 7.80% $K_2O$ and 19.5% $SiO_2$, specific gravity of 40.4 degrees Baumé at 68° F. plus or minus 1.0 degree Baumé and a viscosity of 1,140 centipoises at 68° F. plus or minus 40 centipoises. The resultant coating was white and had the form of a sponge-like cellular agglomeration.

EXAMPLE III

A glass block was coated with the same composition as Example I including 6.56 parts of a blue-green pigment. One form of coloring pigment which has been successfully used consisted of a coloring enamel containing chrome-cobalt-alumina, Product No. 1011, manufactured by Harshaw Chemical Company, Cleveland, Ohio. The resultant coating, in addition to being in the form of a cellular agglomeration, had a blue-green appearance.

EXAMPLE IV

A glass block was coated with the same composition as Example I including 9.84 parts of a yellow pigment. One form of yellow coloring pigment which has been successfully used consisted of a coloring enamel of the vitreous type containing lead antimonate, Product No. 9105, manufactured by Harshaw Chemical Company, Cleveland, Ohio. The resultant coating, in addition to being in the form of a cellular agglomeration, had a yellow appearance.

Coatings applied in accordance with the above examples and the method as outlined above do not interfere in any manner with the sealing of the glass block halves and, because the coating is made of glass forming ingredients, do not prevent the reuse of cullet resulting from breakage and the like which normally occurs. Coating material comprising silicate and sand is entirely compatible with the basic composition of the glass.

The effect of a coating on face 2 of a wall block such as shown in FIG. 2 may more clearly be illustrated by reference to FIG. 5 which is an enlarged fragmentary cross-sectional view of faces 1 and 2 of the wall block shown in FIG. 2 with a coating on face 2. The coating C which has been applied is quite thin and for purposes of illustration has been shown as much heavier than it really is in use. As shown in FIG. 15, partial optical contact of the coating is achieved, that is, the coating has areas of optical contact interspersed with areas out of optical contact over the surface of the prisms. As shown in FIG. 2, in the absence of a coating, a light ray $L_1$ from the sun striking the prisms 28 on face 2 is redirected by prisms 28 in a horizontal direction toward prisms 29.

Figure 5:
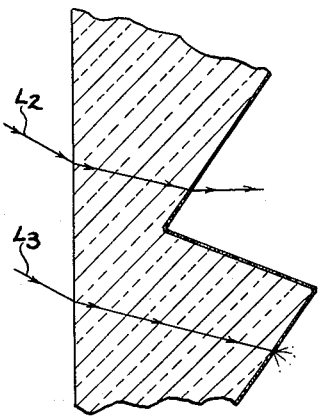
FIG. 5 is a fragmentary sectional view on an enlarged scale of a portion of the fenestration structure shown in FIG. 2.

Referring to FIG. 5, when the coating is applied, the light rays will be differentially affected dependent upon whether or not the light rays strike an area of the prisms wherein the coating is in optical contact or not in optical contact. Where the coating is not in optical contact a light ray $L_2$ is refracted by prism 28 in a generally horizontal position in the normal fashion and thereafter passes through the coating material. As the light ray passes through the coating material, it is not substantially affected. On the other hand, if a light ray $L_3$ strikes the surface of the prism in an area where the coating is in optical contact, the resultant effect will be to cause the light ray to be diffused so that it does not pass directly toward the prisms on face 3. The light rays corresponding to light rays $L_3$ will reduce the total amount of light transmitted toward prisms 29 on face 3 and, in turn, transmitted directly to the interior of the room. The action of the coating on the light rays is shown diagrammatically in FIG. 15.

Figure 6:
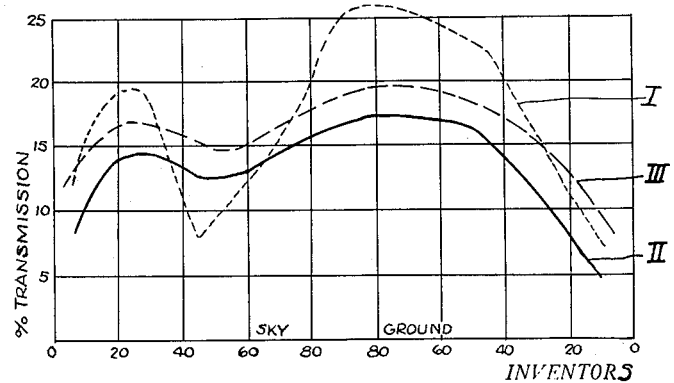
FIG. 6 is a curve of the light transmission of the fenestration shown in FIG. 2.

The presence and absence of a coating on face 2 of the block shown in FIG. 2 is shown in the curves of FIG. 6 which represent the transmission corresponding to the angle of incidence. The dotted curve I in FIG. 6 represents the transmission without a coating and the solid line curve II represents the transmission with a coating. It can be seen that there is a substantial reduction in the transmission throughout most of the angles of incidence. In addition, there is some lessening of the refractive action in the area corresponding to 40–60° skylight. The overall effect is that a more uniform transmission of light is achieved throughout the various angles of incidence.

Figure 7:
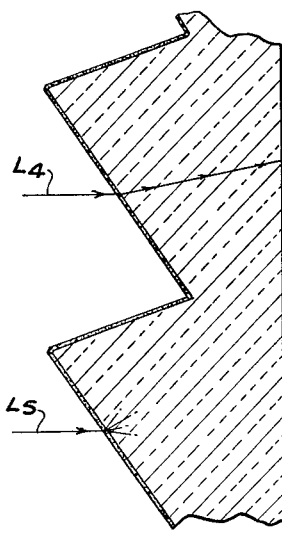
FIG. 7 is a fragmentary sectional view on an enlarged scale of another portion of the fenestration structure shown in FIG. 2.

The effect of a coating on face 3 of the block shown in FIG. 2 may be shown by reference to FIG. 7. A light ray $L_4$ approaching prisms 29 in a generally horizontal direction passes through the coating in the areas where there is no optical contact and is refracted in the normal fashion toward the interior of the room. A light ray $L_5$ striking the coating in an area of optical contact is diffused and does not pass directly to the interior of the room. The overall result is a substantial lessening in the transmission. The curve of light transmitted through a block having a coating on face 3 is shown by the broken line III curve in FIG. 6.

The addition of a colored pigment to the coating on either face 2 or 3 of the block shown in FIG. 2 results in a further enhancing of the pleasing appearance of the block. If the coating is on face 2, the appearance of the block when viewed from the exterior of the room is substantially enhanced; but if the coating with the pigment is on face 3, the appearance of the block when viewed from the interior is substantially enhanced. In either case with or without the pigment the brightness of the block is substantially reduced so that the block is much easier to look at directly and there is less contrast between the brightness of the fenestration and the brightness of the work which the observer is working on.

Figure 8:
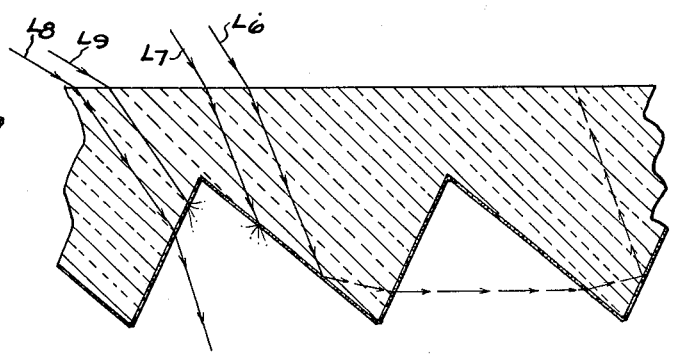
FIG. 8 is a fragmentary sectional view on an enlarged scale of a portion of the fenestration shown in FIG. 3.

The coating may also be applied to prisms 31 of the block used in the opening in the ceiling such as shown in FIG. 3. As previously noted, and referring to FIG. 8, the prisms 31 are of such configuration that sunlight from high altitude angles is rejected and sunlight from low altitude angles and skylight from the northern sky is transmitted. The coating C on prisms 31 will affect the light rays in the same fashion as described with respect to the wall block, that is, where there is no optical contact the refractive action of the prisms will be unaffected and where there is optical contact the light rays will be diffused. Thus, light rays $L_6$ at high altitude angles striking the surface of prisms 31 in an area where there is no optical contact will be refracted and reflected to the exterior, whereas, a light ray $L_7$ at the same altitude angle as light ray $L_6$ striking a surface where there is optical contact will be diffused. A light ray $L_8$ at a low altitude angle striking the surface where there is no optical contact will be transmitted to the interior, whereas a light ray $L_9$ at the same altitude angle striking a surface where there is optical contact will be diffused.

Figure 9:
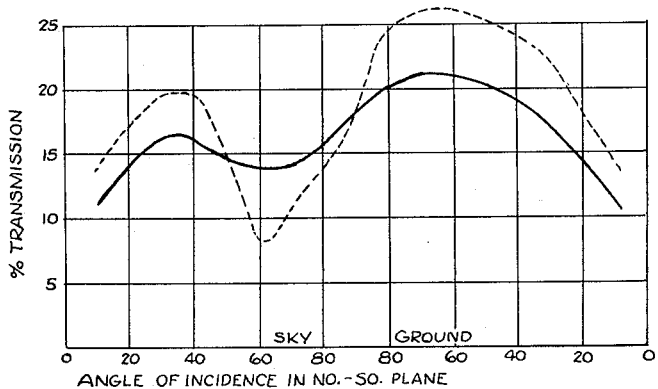
FIG. 9 is a curve of the light transmission of the fenestration shown in FIGS. 3 and 8.

The effect of a coating on the surfaces of the prisms 31 in a roof block may be shown by reference to the curves in FIG. 9 wherein the dotted line curve represents the action of the prism without a coating, and the solid line curve represents the action of prisms with a coating.

It can be seen that the transmission throughout most of the range of altitude angles of incidence is substantially reduced. However, in the area of high altitude angles there is some loss of the rejecting power of the prisms. The net result is that there is a substantially uniform transmission of light throughout various sun altitude angles and various positions of light from the northern sky.

Figure 10:
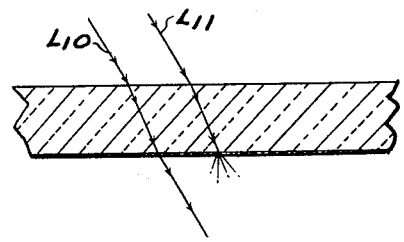
FIG. 10 is a sectional view of a modified form of the fenestration structure embodying the invention.
Figure 12:
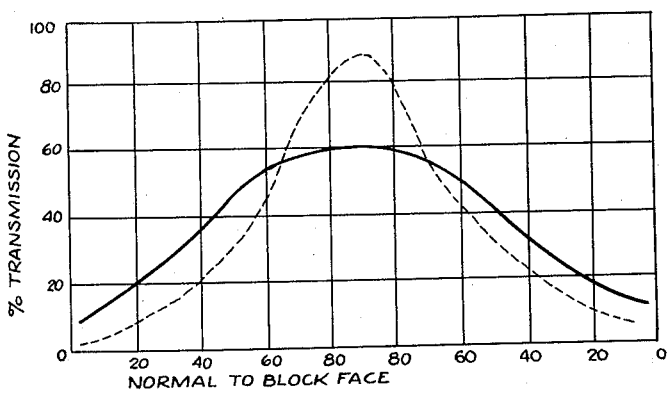
FIG. 12 is a curve of the light-transmitting characteristics of the fenestration structure shown in FIG. 10.

The coating may also be applied to surfaces of a smooth walled glass block as shown in FIG. 10. In such a case a light ray $L_{10}$ striking the surfaces in an area where there is no optical contact will be transmitted, whereas a light ray $L_{11}$ striking the surface where there is optical contact will be diffused. The effect of the coating on the transmission properties of the wall block shown in FIG. 10 may be further understood by reference to the curves shown in FIG. 12 which show the transmission at various angles of incidence to the face of the block having the coating thereon. The dotted line curve represents the transmission without the coating and the solid line curve represents the transmission with the coating.

It can be seen that the high transmission at high angles of incidence is substantially reduced, whereas the transmission at low angles of incidence is slightly increased resulting in a more uniform transmission throughout the various angles of incidence.

Figure 11:
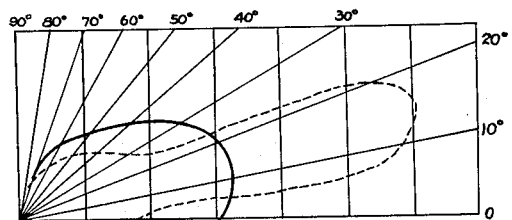
FIG. 11 is a brightness curve of the fenestration structure shown in FIG. 10.

In the case where there are no prisms on the surfaces of the walls of the glass block an additional advantage is achieved in that the directional change in light is not so pronounced, that is, the intensity of light from various viewers' angles is more nearly uniform. This may be shown by reference to FIG. 11 wherein the dotted line curve represents the brightness of the block without a coating as viewed from various angles and the solid line curve represents the brightness of a block having a coating viewed from various angles.

It can be seen that the brightness is not only substantially reduced but made more uniform throughout the various angles.

It can thus be seen that we have provided a fenestration structure wherein the brightness is substantially reduced when viewed by an observer in the interior of a room. In addition, where colored pigment is used in the coating, the appearance of the glass block is substantially enhanced. This may be done at the choice of a designer or architect, that is, whether the appearance is to be enhanced when viewed from the exterior or the interior, the colored pigment and coating being applied to face 2 in order to enhance the appearance when viewed from the exterior and being applied to face 3 to enhance the appearance when viewed from the interior. The amount of coloring pigment may be varied to obtain different intensities of coloration.

We have found that the coating which comprises the silicate, sand and pigment when applied to the interior surfaces is not subject to deterioration or erosion because the glass block halves are sealed and there is little or no air present in the space between the halves because the space between the halves is hermetically sealed and in some instances evacuated. The coating, although applied to the face, may also be inadvertently applied on the sealing edges but does not adversely affect the sealing action of the glass block halves to each other. In addition the coating is compatible with the glass composition so that waste in the form of cullet may be reused without affecting the glass batch.

When the coating is used on glass block incorporating prismatic structure in order to obtain control of daylight, it does not adversely affect the normal action of the prisms because it is in partial optical contact with the surfaces thereof.

We have found that the presence of the silicate coating on the internal faces of the glass block, in addition to providing the desired light-correcting action, substantially depresses the dew point in the interior of the block so that any moisture contained therein is not condensed at as high a temperature. A glass block sealed under normal conditions without a coating has a substantially higher dew point temperature at which the moisture in the air or gases sealed therein begin to condense than a block having the coating thereon and sealed under the same conditions. Although the dew point temperature of a block varies depending on the manner of sealing and the external temperature at the sealing machine, we have found, as shown in Table I, that in each case the presence of the coating substantially reduces the dew point of the block.

*Table I*

|  | Dew Point Temperature, ° F. | | | |
| --- | --- | --- | --- | --- |
|  | No Coating | White Coating | Yellow Coating | Green Coating |
| Run 1 | 42.5 | 24.2 | 25.0 | 21.2 |
| Run 2 | 42.0 | 7.0 | 21.0 | 17.0 |
| Run 3 | 0–1 | −14.0 | −12.0 | −11.0 |

Although we do not wish to be bound by the theory involved, in our opinion, the depressing of the dew point is due to the silicate coating acting as a desiccant.

We claim:

1. In a fenestration structure for utilizing daylight to light an interior, the combination comprising a sheet of light transmitting material intended to be interposed in a vertical position, one surface of said sheet having a series of symmetrical parallel ribs formed thereon extending longitudinally thereof, said ribs extending vertically when the sheet is positioned in vertical position, the configuration of said ribs being such that sunlight from wide azimuth angles striking the ribs are redirected toward the other surface of said sheet in a direction generally perpendicular thereto, said other surface of said sheet comprising a series of prisms, said prisms extending horizontally when the sheet is positioned in vertical position, each said prism having a configuration such that light rays striking said prism are directed in substantially horizontal directions, a thin substantially continuous translucent coating bonded to the surfaces of said prisms and comprising a cellular agglomeration of sodium silicate having sand dispersed therein, said coating having areas in optical contact with the surfaces of said prisms interspersed with areas out of optical contact with the surfaces of said prisms throughout the extent thereof thereby diffusing the light transmitted to said prisms in the areas of optical contact and transmitting the light directly and without substantial diffusion in the remaining areas.

2. In a fenestration for utilizing daylight to light an interior, the combination comprising a sheet of light transmitting material intended to be interposed in a vertical position, one surface of said sheet having a series of parallel prisms thereon, said prisms extending generally horizontally when the sheet is positioned in a vertical position, each said prism having a configuration such that light rays directed thereon after having passed through the other surface of said sheet are redirected in substantially horizontal directions, a thin substantially continuous translucent coating bonded to the surfaces of said prisms and comprising a cellular agglomeration of sodium silicate having sand dispersed therein, said coating having areas in optical contact with the surfaces of said prisms interspersed with areas out of optical contact with said surfaces of said prisms throughout the extent thereof thereby diffusing the light transmitted to said prisms in the areas of optical contact and transmitting the light directly and without substantial diffusion in the remaining areas.

3. In a fenestration structure for utilizing daylight to light an interior, the combination comprising two parallel spaced sheets of light-transmitting material intended to be interposed vertically in an opening, the surface of said sheet which is intended to be adjacent the daylight having a series of symmetrical parallel ribs formed thereon adapted to extend vertically when the fenestration is in position, each rib having a configuration such that light rays striking the rib at wide azimuth angles to the plane of the light-transmitting material are redirected toward the other surface of said wall in directions substantially normal to the plane of the sheet, said second surface of said sheet adjacent the exterior comprising a series of horizontal prisms, each said prism having a configuration such that light rays are directed in substantially horizontal directions toward the next successive sheet, the surface of said second sheet nearest the first sheet having a series of horizontal prisms thereon, each said prism having a configuration such that light rays directed against said prism in a horizontal direction are redirected upwardly toward the interior being lighted, the surface of said second sheet adjacent the interior being formed with a series of symmetrical parallel ribs, each said rib having a configuration such that light rays passing through the second sheet and striking the surfaces of said ribs are redirected at wide angles toward the interior, the prisms on one of said sheets being formed with a thin substantially continuous translucent coating bonded to the surfaces of said prisms and comprising a cellular agglomeration of sodium silicate having sand dispersed therein, said coating having areas in optical contact with the surfaces of said prisms interspersed with areas out of optical contact with the surfaces of said prisms throughout the extent thereof thereby diffusing the light transmitted to said prisms in the areas of optical contact and transmitting the light directly and without substantial diffusion in the remaining areas.

4. In a fenestration structure for utilizing daylight to light an interior, the combination comprising a sheet of light-transmitting material adapted to be interposed in a generally horizontal position between the daylight and the interior being lighted, said sheet having a series of unsymmetrical parallel prisms on the face thereof which is adapted to be nearest the interior, each said prism having a configuration such that sunlight striking said prisms when uncoated from high altitude angles is substantially totally reflected and sunlight from low alitude angles and light from the northern sky are transmitted through the prisms toward the interior being lighted, a thin substantially continuous translucent coating bonded to the surfaces of said prisms and comprising a cellular agglomeration of sodium silicate having sand dispersed therein, said coating having areas in optical contact with the surfaces of said prisms interspersed with areas out of optical contact with the surfaces of said prisms throughout the extent thereof whereby light from high altitude angles is diffused in the areas of optical contact and totally reflected in the remaining areas and sunlight from low altitude angles and light from the northern sky are diffused in the areas of optical contact and transmitted directly and without substantial diffusion in the remaining areas through the prisms toward the interior being lighted.

5. In a fenestration structure for utilizing daylight to light an interior, the combination comprising a series of four air-glass interfaces adapted to be interposed in a substantially horizontal position between the daylight and the interior being lighted, the second interface from the light source having a series of parallel unsymmetrical prisms formed thereon, each said prism having a configuration such that sunlight striking said prisms when uncoated from high altitude angles is totally reflected and sunlight from low altitude angles and light from the northern sky are transmitted through the prisms toward the third and fourth interfaces, said third and fourth interfaces having light-diffusing means formed thereon for diffusing the light passing therethrough into the interior, a thin substantially continuous translucent coating bonded to the surfaces of said prisms and comprising a cellular agglomeration of sodium silicate having sand dispersed therein, said coating having areas in optical contact with the surfaces of said prisms interspersed with areas out of optical contact with the surfaces of said prisms throughout the extent thereof whereby light from high altitude angles is diffused in the areas of optical contact and totally reflected in the remaining areas and sunlight from low altitude angles and light from the northern sky are diffused in the areas of optical contact and transmitted directly and without substantial diffusion in the remaining areas through the prisms toward the interior being lighted.

6. In a fenestration structure for utilizing daylight to light an interior, the combination comprising a pair of spaced walls of glass adapted to be interposed between the daylight and the interior, means hermetically sealing the space between said walls of glass, and a thin substantially continuous translucent coating bonded to one of the surfaces of said walls within said sealed space and comprising a cellular agglomeration of sodium silicate having sand dispersed therein, said coating having areas in optical contact with said surface interspersed with areas out of optical contact with said surface throughout the extent thereof thereby diffusing the light transmitted to said surface in the areas of optical contact and transmitting the light directly and without substantial diffusion in the remaining areas.

References Cited in the file of this patent

UNITED STATES PATENTS

| | | |
|---|---|---|
| 1,453,593 | Meloche | May 1, 1923 |
| 1,560,838 | Meloche | Nov. 10, 1925 |
| 1,979,758 | Merritt | Nov. 6, 1934 |
| 2,127,150 | Zimmerman et al. | Aug. 16, 1938 |
| 2,149,246 | Zimmerman et al. | Feb. 28, 1939 |
| 2,187,622 | Koerner | Jan. 16, 1940 |
| 2,191,953 | Blau | Feb. 27, 1940 |
| 2,220,861 | Blodgett | Nov. 5, 1940 |
| 2,244,291 | Eastus | June 3, 1941 |
| 2,261,011 | Wiley | Oct. 28, 1941 |
| 2,281,280 | Gabor | Apr. 28, 1942 |
| 2,297,337 | Wiley | Sept. 29, 1942 |
| 2,576,942 | Jakob | Dec. 4, 1951 |
| 2,665,610 | Harrison | Jan. 12, 1954 |
| 2,812,690 | Boyd | Nov. 12, 1957 |
| 2,812,692 | Boyd | Nov. 12, 1957 |
| 2,844,998 | Vincent | July 24, 1958 |